Patented Dec. 18, 1951

2,578,668

UNITED STATES PATENT OFFICE 2,578,668

QUATERNARY PYRIDINIUM HALIDES

Edgar C. Britton, Midland, Mich., and John N. Hansen, Albert Lea, Minn., assignors to The Dow Chemical Company, Midland, Mich., a corporation of Delaware No Drawing. Application October 21, 1949, Serial No. 122,846

4 Claims. (Cl. 260—297)

This invention relates to quaternary amine compounds and is particularly concerned with pyridinium and gamma-picolinium halides.

The new compounds have the following formula:

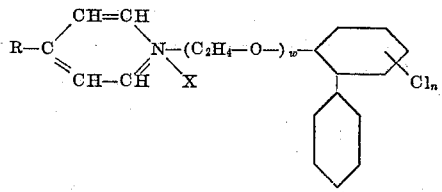

wherein R represents hydrogen or a methyl radical, X represents chlorine or bromine, $w$ is 1 or 2, and $n$ is an integer from 1 to 3, inclusive. Representative members of the above compound class have been prepared and found to be readily soluble in water and somewhat soluble in many organic solvents. The new compounds and compositions thereof with suitable carriers are useful as insecticides, bactericides, fungicides, and germicides.

The new compounds may be prepared by reacting pyridine or gamma-picoline with a suitable ether halide, such as a chloro-2-xenoxy-ethyl halide or chloro-2-xenoxy-ethoxy-ethyl halide. In carrying out the preparation, the nitrogen base and ether halide are mixed together and heated to a reaction temperature. Suitable inert organic solvents may be employed as reaction media if desired. It is generally sufficient to dissolve the reactants one in the other and to heat and stir the mixture until reaction is completed. The reactants preferably are combined in approximately equimolecular proportions.

When the reaction is completed, the product is treated to separate out unreacted amine and ether halide and undesired by-products. This is conveniently accomplished by extracting the crude reaction mixture with selective solvents for the amine halide or for the amine and ether halide. Similarly, there may be employed a series of selective precipitations of the product using such solvents or solvent pairs as retain uncombined reactants in solution. Where the amine halide compound is a solid, recrystallization accomplishes the desired purification. If desired, the product may be clarified as by treatment with activated charcoal. The final product is dried to remove traces of water and solvent.

The preferred temperature of reaction varies with the particular reactants employed. In general, a temperature of from about 60° C. to the decomposition temperature of the mixture gives satisfactory results. One mode of operation includes heating the mixture of reactants to its boiling temperature and under reflux. A further convenient procedure is to heat the reaction mixture on a steam bath so as to operate at a temperature of 98°–100° C. The time of heating varies inversely with the temperature. 2 or 3 hours may be sufficient to complete the reaction at the boiling temperature of the reaction mixture, whereas several days may be required when operating at lower temperatures.

The following examples illustrate the invention but are not to be construed as limiting:

*Example 1.—2-[2-(3,5-dichloro-2-xenoxy)-ethoxy]-ethyl pyridinium chloride*

69.1 grams (0.2 mol) of 2-[2-(3,5-dichloro-2-xenoxy) - ethoxy] - ethyl chloride (boiling at 212°–221° C. at 4 millimeters' pressure) and 15.8 grams (0.2 mol) of pyridine were mixed together and heated in a steam bath at 98° C. for a period of 5 days with occasional mixing. The resulting product was a dark, viscous, resinous mixture. This product was dissolved in 300 milliliters of hot methyl ethyl ketone and the solution slowly cooled, whereupon a crystalline compound separated from solution. The mixture was filtered and the residue washed with acetone and dried at 65° C. As the product of reaction, there was obtained 63 grams of 2-[2-(3,5-dichloro - 2 - xenoxy) - ethoxy] pyridinium chloride as straw-colored crystals melting at 137°–9° C. This product is very soluble in water and appears to have hygroscopic properties.

*Example 2.—2-[2-(3,5,x-trichloro - 2 - xenoxy)-ethoxy]-ethyl pyridinium chloride*

76 grams (0.2 mol) of 2-[2-(3,5,x-trichloro-2-xenoxy)-ethoxy]-ethyl chloride (boiling at 253°–260° C. at 1 millimeter pressure) and 15.8 grams (0.2 mol) of pyridine were mixed together and heated at 98° C. for 5 days. The crude viscous product was taken up in methyl ethyl ketone and thereafter cooled. A crystalline product separated from the solution and was recovered by filtration of the mixture. The residue from the filtering operation was washed with acetone and dried to obtain 69 grams of the compound 2-[2-(3,5,x-trichloro-2-xenoxy) - ethoxy]-ethyl pyridinium chloride as light purple-colored crystals melting at 94°–100° C. This compound appears to be soluble in water in all proportions and does not display the hygroscopic properties of the derivative described in Example 1.

Example 3.—2-(5-chloro-2-xenoxy)-ethyl gamma-picolinium bromide 16.37 grams (0.05 mol) of 2-(5-chloro-2-xenoxy)-ethyl bromide (boiling at 184°–187° C. at 6 millimeters' pressure) and 4.65 grams (0.05 mol) of gamma-picoline were mixed together and heated for 3 hours at 98° C. with occasional agitation. The resulting crude product was washed with carbon tetrachloride and filtered and the residue dissolved in absolute ethyl alcohol. This solution was then diluted with ether and allowed to stand, whereupon a crystalline product separated. The resulting mixture was filtered to obtain 11 grams of 2-(5-chloro-2-xenoxy)-ethyl gamma-picolinium bromide as a light-colored crystalline product melting at 131°–132° C. The product is readily soluble in water and ethyl alcohol and difficultly soluble in carbon tetrachloride and diethyl ether.

Example 4.—2-[2-(monochloro-2-xenoxy)-ethoxy]-ethyl pyridinium chloride 155.5 grams (0.05 mol) of 2-[2-(monochloro-2-xenoxy)-ethoxy]-ethyl chloride (boiling at 195° C. at 3 millimeters' pressure) and 39.9 grams (0.5 mol) of pyridine were mixed together and heated at 98° C. with occasional agitation for a period of 8 days. The dark viscous reaction mixture was dissolved in a small amount of hot chloroform and petroleum ether added to the solution to precipitate out the oily reaction product. The latter was recovered from the excess solvent by decantation and thoroughly washed with petroleum ether. Residual traces of solvent were removed from the oily product by heating on a steam bath under reduced pressure. The product of reaction consisted of 164 grams of 2-[2-(monochloro-2-xenoxy)-ethoxy]-ethyl pyridinium chloride as a red-amber oil. This product is readily soluble in water and chloroform and difficultly soluble in petroleum ether.

By reacting pyridine or gamma-picoline with other suitable ether chlorides or bromides substantially as described in the foregoing examples, other compounds falling within the scope of the present invention are obtained. Representative of the ether halides which may be so employed are 2-(3,5-dichloro-2-xenoxy)-ethyl chloride,
2-(3,5,x-trichloro-2-xenoxy)-ethyl bromide,
2-[2-(3,5-dichloro-2-xenoxy)-ethoxy]-ethyl bromide, and the like. These ether halides and those employed in the examples are conveniently produced by reacting together a chlorinated xenol, such as 3-chloro-2-hydroxydiphenyl or 3,5,x-trichloro-2-hydroxydiphenyl, with a suitable dihaloaliphatic hydrocarbon, e. g. ethylene dibromide and ethylene dichloride, or a dihalo-diethyl ether, e. g., $\beta,\beta'$-dichlorodiethyl ether and $\beta,\beta'$-dibromodiethyl ether, in the presence of aqueous alkali. In carrying out such reaction the mixture of water, alkali, and the organic reactants is heated to a temperature approaching the boiling temperature of the mixture and is thereafter cooled. The desired ether compounds are separated therefrom as by extraction and fractional distillation.

The new compounds of the present invention have marked parasiticidal properties. Thus 2-[2-(monochloro-2-xenoxy)-ethoxy]-ethyl pyridinium chloride may be employed in aqueous solution to treat cotton fabrics for the control of mildew. 10-ounce cotton duck containing 1.5 per cent by weight of the pyridinium compound is protected against *Chaetomium globosum*. The compound according to standard F. D. A. procedures has a phenol coefficient of 37 against *E. typhosa*. 2-(5-chloro-2-xenoxy)-ethyl gamma-picolinium bromide at 1 pound per 100 gallons of water is employed for the control of Mexican bean beetle to obtain a 75 per cent kill of the organism.

The present application is a continuation-in-part of our copending application Serial No. 611,704, filed August 20, 1945, now abandoned.

We claim:

1. A quaternary amine compound having the formula

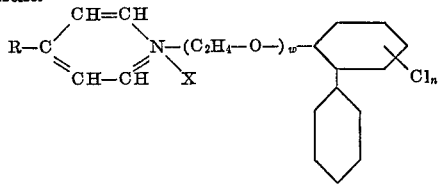

wherein R is selected from the group consisting of hydrogen and the methyl radical, X is a halogen of the group consisting of chlorine and bromine, $w$ is an integer from 1 to 2, inclusive, and $n$ is an integer from 1 to 3, inclusive.

2. 2-[2-(3,5-dichloro-2-xenoxy)-ethoxy]-ethyl pyridinium chloride.

3. 2-[2-(3,5,x-trichloro-2-xenoxy)-ethoxy]-ethyl pyridinium chloride.

4. 2-(5-chloro-2-xenoxy)-ethyl gamma-picolinium bromide.

EDGAR C. BRITTON.
JOHN N. HANSEN.

REFERENCES CITED

The following references are of record in the file of this patent:

UNITED STATES PATENTS

| Number | Name | Date |
| --- | --- | --- |
| 2,295,504 | Shelton | Sept. 8, 1942 |
| 2,336,465 | Buck et al. | Dec. 14, 1943 |